United States Patent
Kim et al.

(10) Patent No.: US 11,012,182 B2
(45) Date of Patent: May 18, 2021

(54) METHOD FOR MEASURING INTERFERENCE IN NEXT GENERATION COMMUNICATION SYSTEM AND APPARATUS THEREFOR

(71) Applicant: LG Electronics Inc., Seoul (KR)

(72) Inventors: Hyungtae Kim, Seoul (KR); Jiwon Kang, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/500,471

(22) PCT Filed: Apr. 26, 2018

(86) PCT No.: PCT/KR2018/004877
§ 371 (c)(1),
(2) Date: Oct. 3, 2019

(87) PCT Pub. No.: WO2018/199664
PCT Pub. Date: Nov. 1, 2018

(65) Prior Publication Data
US 2020/0036472 A1    Jan. 30, 2020

Related U.S. Application Data

(60) Provisional application No. 62/491,271, filed on Apr. 28, 2017.

(51) Int. Cl.
*H04L 1/00* (2006.01)
*H04B 17/24* (2015.01)
(Continued)

(52) U.S. Cl.
CPC ........... *H04L 1/0026* (2013.01); *H04B 17/24* (2015.01); *H04B 17/336* (2015.01); *H04L 5/0051* (2013.01); *H04W 24/10* (2013.01)

(58) Field of Classification Search
CPC ... H04L 1/0026; H04L 5/0073; H04L 5/0057; H04B 17/24; H04B 17/336
See application file for complete search history.

(56) References Cited

U.S. PATENT DOCUMENTS

| | | | |
|---|---|---|---|
| 2014/0198750 A1* | 7/2014 | Prasad | H04B 7/0452 370/329 |
| 2014/0198751 A1* | 7/2014 | Prasad | H04B 7/024 370/329 |

(Continued)

OTHER PUBLICATIONS

R1-1704345: AT&T, Interference measurement framework: 3GPP TSG RAN WG1 Meeting #88bis, Spokane, USA Mar. 25, 2017, pp. 1-2.

(Continued)

*Primary Examiner* — Min Jung
(74) *Attorney, Agent, or Firm* — Dentons US LLP

(57) ABSTRACT

The present application discloses a method for reporting, by a terminal, channel status information (CSI) to a base station in a wireless communication system. Specifically, the method comprises the steps of: receiving a plurality of non-zero power (NZP) CSI-reference signals (CSI-RSs) from the base station; selecting one NZP CSI-RS on the basis of power received from the plurality of NZP CSI-RSs; measuring interference by removing the selected NZP CSI-RS from a channel determined using the selected NZP CSI-RS; and reporting, to the base station, the CSI including an indicator indicating the selected NZP CSI-RS and information related to the measured interference.

4 Claims, 9 Drawing Sheets

(51) Int. Cl.
*H04B 17/336* (2015.01)
*H04L 5/00* (2006.01)
*H04W 24/10* (2009.01)

(56) References Cited

U.S. PATENT DOCUMENTS

| | | | |
|---|---|---|---|
| 2015/0063142 A1* | 3/2015 | Kim | H04B 7/0617 370/252 |
| 2015/0171948 A1 | 6/2015 | Xiao et al. | |
| 2017/0006492 A1 | 1/2017 | Khoshnevisan et al. | |
| 2017/0134130 A1* | 5/2017 | Li | H04W 52/42 |
| 2019/0068303 A1* | 2/2019 | Gao | H04B 17/318 |
| 2019/0335475 A1* | 10/2019 | Liang | H04W 72/0413 |
| 2020/0252110 A1* | 8/2020 | Kim | H04B 7/0417 |

OTHER PUBLICATIONS

R1-1704555: CATT, Discussion on interference measurement, 3 GPP TSG RAN WG1 Meeting 88bis, Spokane, USA Mar. 25, 2017, pp. 1-3.
R1-1706719: Huawei et al, WF on NZP CSI-RS for interference measurement, 3GPP TSG RAN WG1 Meeting #88bis, Spokane, USA, Apr. 9, 2017, pp. 1-3.

\* cited by examiner (A) CONTROL-PLANE PROTOCOL STACK (B) USER-PLANE PROTOCOL STACK

METHOD FOR MEASURING INTERFERENCE IN NEXT GENERATION COMMUNICATION SYSTEM AND APPARATUS THEREFOR

This application is the National Stage filing under 35 U.S.C. 371 of International Application No. PCT/KR2018/004877, filed on Apr. 26, 2018, which claims the benefit of U.S. Provisional Application No. 62/491,271, filed on Apr. 28, 2017, the contents of which are all hereby incorporated by reference herein in their entirety.

TECHNICAL FIELD

The present invention relates to a wireless communication system, and more particularly, to a method of performing interference measurement in a next generation wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the technical task of the present invention is to propose a method of performing interference measurement in a next generation wireless communication system and apparatus therefor.

Technical Solutions

In one technical aspect of the present invention, provided herein is a method of reporting Channel Status Information (CSI) to a base station by a user equipment in a wireless communication system, the method including receiving a plurality of Non-Zero-Power (NZP) Channel Status Information-Reference Signals (CSI-RSs) from the base station, selecting a single NZP CSI-RS based on reception power of a plurality of the NZP CSI-RSs, measuring interference by removing the selected NZP CSI-RS from a channel estimated using the selected NZP CSI-RS, and reporting the CSI including an indicator indicating the selected NZP CSI-RS and information on the measured interference to the base station.

In another technical aspect of the present invention, provided herein is a user equipment in a wireless communication system, the user equipment including a wireless communication module and a processor configured to report Channel Status Information (CSI) to a base station by being connected to the wireless communication module, wherein the processor is further configured to select a single NZP CSI-RS based on reception power of a plurality of Non-Zero-Power (NZP) Channel Status Information-Reference Signals (CSI-RSs) received from the base station and measure interference by removing the selected NZP CSI-RS from a channel estimated using the selected NZP CSI-RS and wherein the CSI includes an indicator indicating the selected NZP CSI-RS and information on the measured interference.

Here, the user equipment receives information indicating whether channels corresponding to a plurality of the NZP CSI-RSs are identical from the base station.

Preferably, if an antenna port number of the selected NZP CSI-RS is equal to or smaller than a threshold, the interference is measured by removing a specific NZP CSI-RS linked to the selected NZP CSI-RS from the channel estimated using the selected NZP CSI-RS together with the selected NZP CSI-RS. More preferably, the specific NZP CSI-RS and the selected NZP CSI-RS are received at a same timing.

Additionally, if an antenna port number of the selected NZP CSI-RS is equal to or smaller than a threshold, the selected NZP CSI-RS are grouped into a plurality of antenna port groups and interferences are measured for a plurality of the antenna port groups, respectively. And, the CSI includes information on the antenna port groups.

Advantageous Effects

According to an embodiment of the present invention, DM-RS for broadcast data in a next generation communication system can be transmitted more efficiently.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

Figure 1:
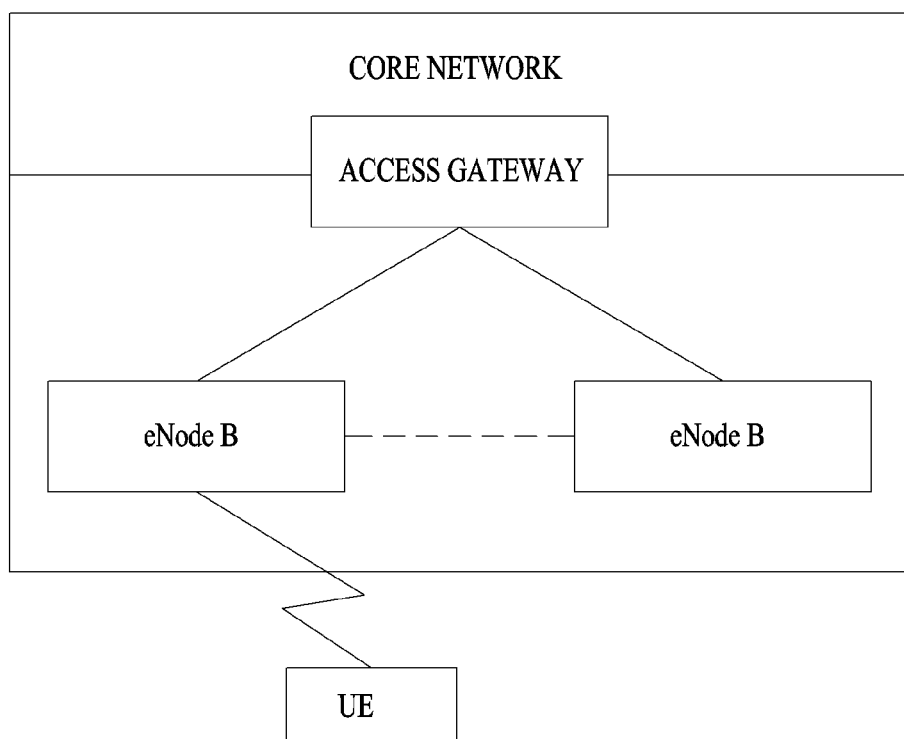
FIG. 1 illustrates a configuration of an Evolved Universal Mobile Telecommunications System (E-UMTS) network as an example of a wireless communication system.
Figure 2:
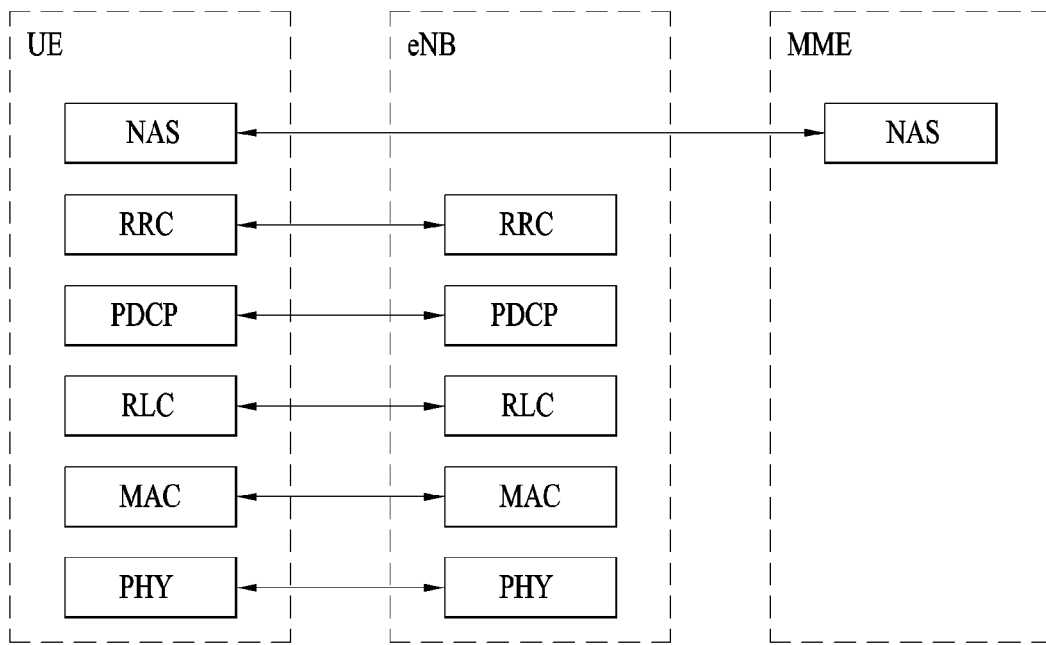
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
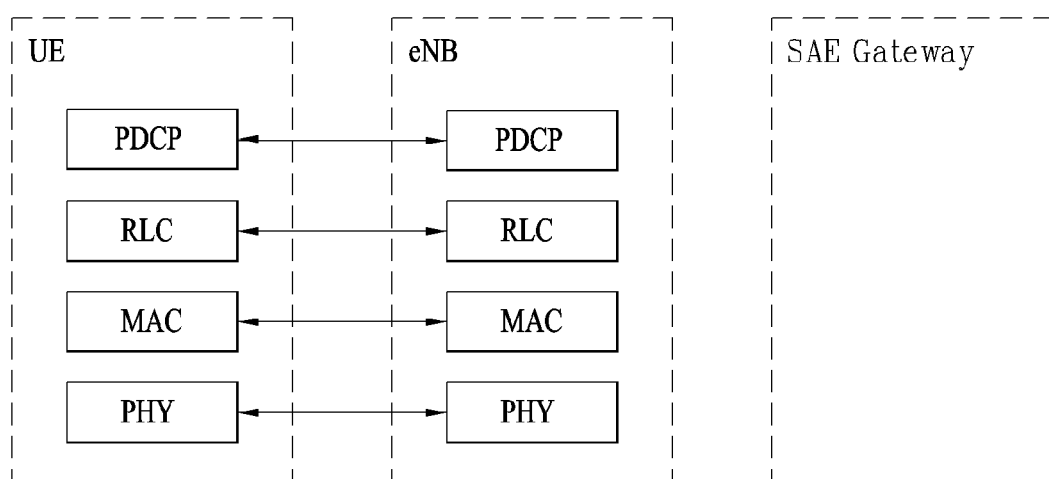

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
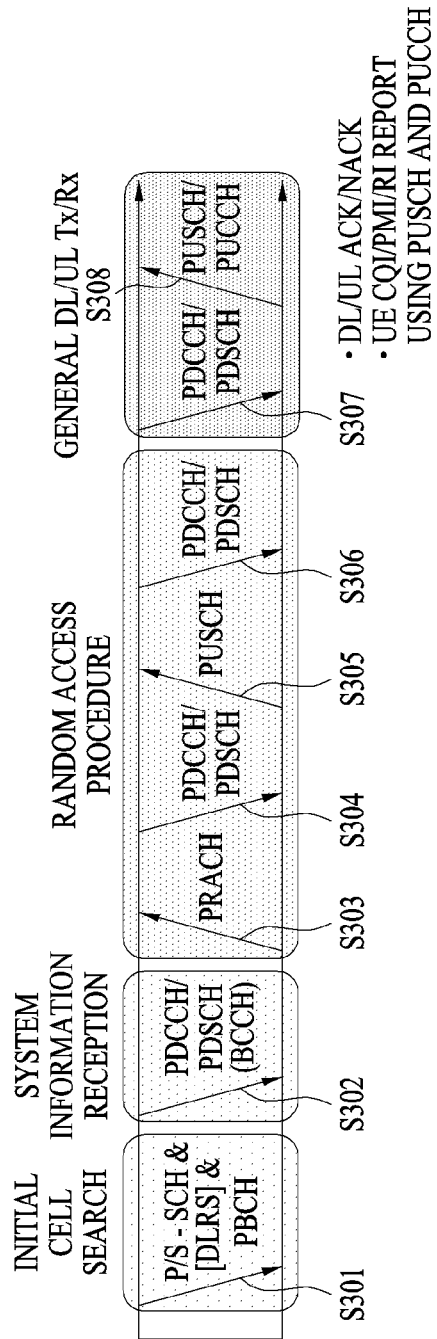
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
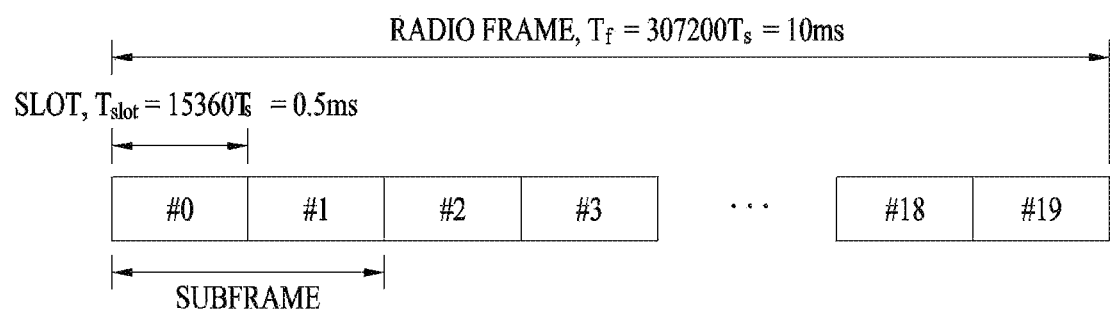
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
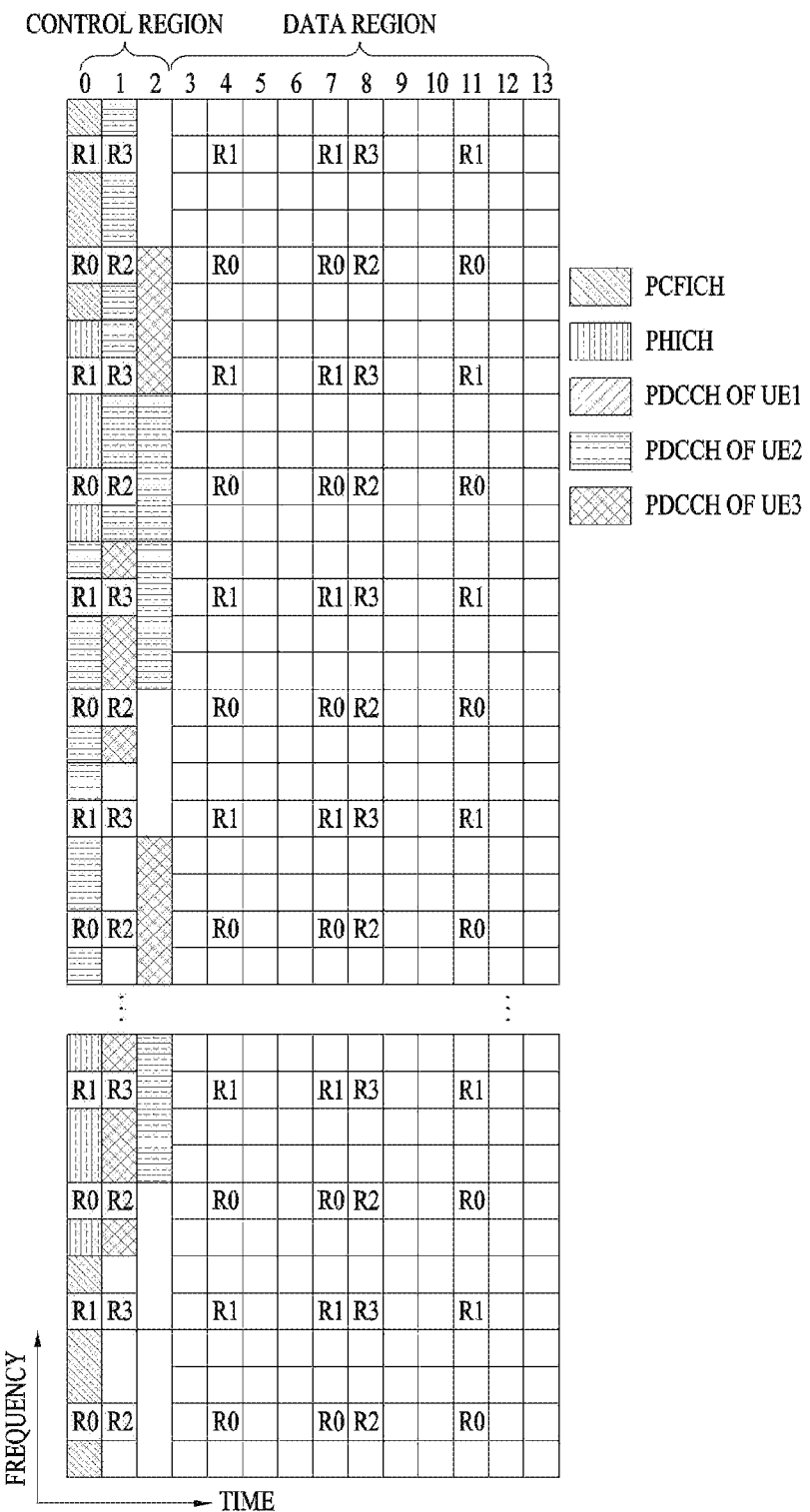
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3.

RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
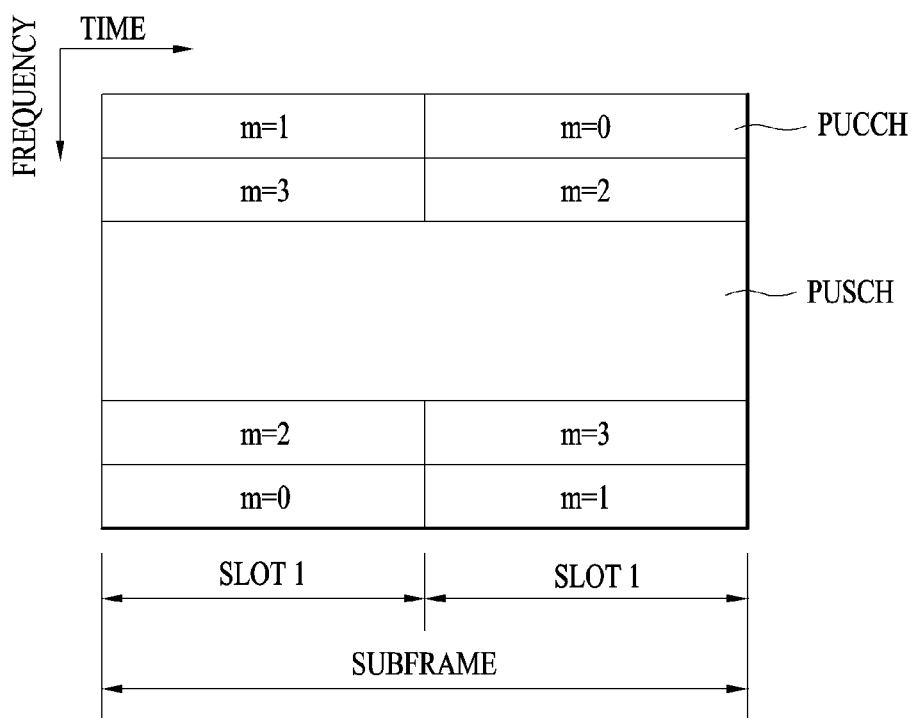
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, Chanel State Information (CSI) reporting is described. In the current LTE standard, there exist two kinds of transmission methods including open-loop MIMO operated without CSI and closed-loop MIMO operated on the basis of CSI. Particularly, in the closed-loop MIMO, each of a Base Station (BS) and a User Equipment (UE) can perform beamforming based on CSI in order to obtain a multiplexing gain of an MIMO antenna. In order to obtain CSI from the UE, the BS orders the UE to feed back CSI on a DL signal by assigning Physical Uplink Control CHannel (PUCCH) or Physical Uplink Shared CHannel (PUSCH) to the UE.

CSI is mainly classified into three kinds of information such as Rank Indicator (RI), Precoding Matrix Index (PMI) and Channel Quality Indication (CQI). First of all, as described above, RI indicates rank information of a channel and means the number of streams that can be received by a UE through a frequency-time resource. Moreover, as RI is determined by long term fading of a channel, it is fed back to a base station by a period normally longer than a value of PMI or CQI.

Secondly, PMI is a value reflecting spatial property of a channel and indicates a precoding matrix index of a BS preferred by a UE with reference to a metric such as Signal-to-Interference & Noise Ratio (SINR) or the like. Finally, CQI is a value indicating strength of a channel and normally means a received SINR obtainable when a BS uses PMI.

In 3GPP LTE-A system, a BS may configure a multitude e of CSI processes for a UE and receive a report of CSI on each CSI process. Here, the CSI process is configured with a CSI-RS resource for specifying a quality of a signal from the BS and a CSI-Interference Measurement (CSI-IM) resource for interference measurement, i.e., an Interference Measurement Resource (IMR).

As a wavelength is shortened in Millimeter Wave (mmW), a multitude of antenna elements can be installed in the same area. Particularly, a wavelength on 30 GHz band is 1 cm and total 64 (=8×8) antenna elements of a 2D (dimension) array type can be installed on a panel in size of 4×4 cm with an interval of 0.5 lambda (wavelength). Thus, according to the recent trend of mmW fields, a multitude of antenna elements are used to increase coverage by raising a BeamForming (BF) gain or attempt the increase of throughput.

In this case, if Transceiver Unit (TXRU) is provided to enable transmission power and phase adjustments per antenna element, independent beamforming is available per frequency resource. Yet, if TXRU is installed for each of about 100 antenna elements, it is inefficient in aspect of costs. Therefore, currently considered is a scheme of mapping a multitude of antenna elements to a single TXRU and adjusting a direction of a beam with an analog phase shifter. Since such an analog beamforming scheme can make a single beam direction only, it is disadvantageous in that a frequency selective beamforming cannot be performed.

As an intermediate form between digital beamforming and analog beamforming, it is able to consider hybrid beamforming having B TXRUs less than Q antenna elements. In this case, although there is a difference according to a type of the connection between the B TXRUs and the Q antenna elements, the number of the simultaneously transmittable beam directions is limited to B or less.

Figure 7:
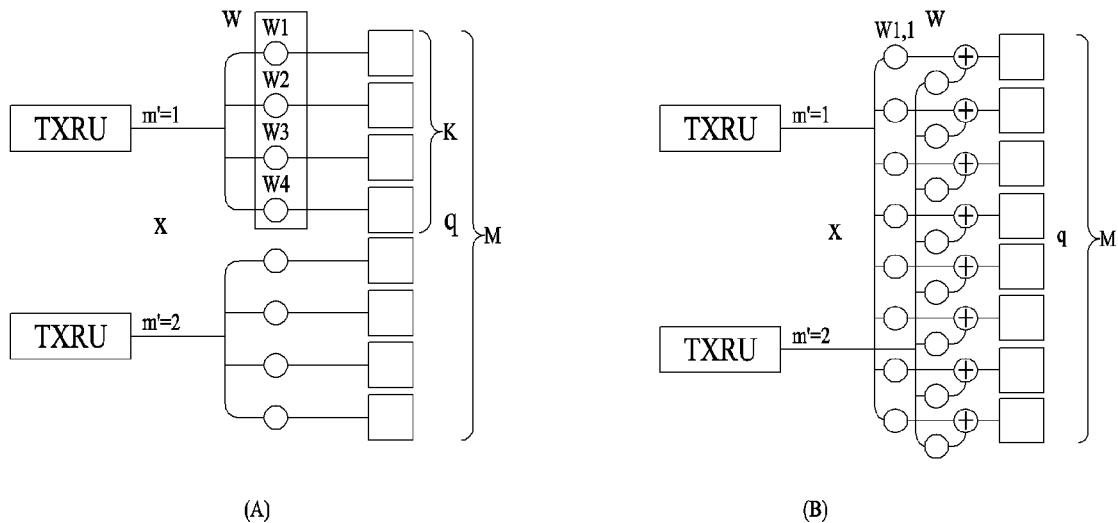
FIG. 7 shows examples of types of connections between TXRU and antenna elements.

FIG. 7 shows examples of types of connections between TXRU and antenna elements.

FIG. 7(A) shows a type that a TXRU is connected to a subarray. In this case, an antenna element is connected to a single TXRU only. On the contrary, FIG. 7(B) shows a type that a TXRU is connected to all antenna elements. In this case, an antenna element is connected to all TXRUs. In FIG. 7, W indicates a phase vector multiplied by an analog phase shifter. Namely, a direction of analog beamforming is determined by W. Here, the mapping between a CSI-RS antenna port and TXRUs may correspond to 1-to-1 or 1-to-many.

As more communication devices demand larger communication capacity, the necessity for wireless wideband communication improved in comparison with the legacy Radio Access Technology (RAT) is rising. And, massive Machine Type Communications (MTC), which provides various services anytime anywhere by connecting a multitude of devices and things, is one of the major issues that will be considered by the next generation communication as well. Moreover, a communication system design, which considers a service/UE sensitive to reliability and latency, is currently discussed. And, the introduction of the next generation RAT considering such facts is currently discussed, which shall be referred to as NewRAT in the present invention for clarity.

Figure 8:
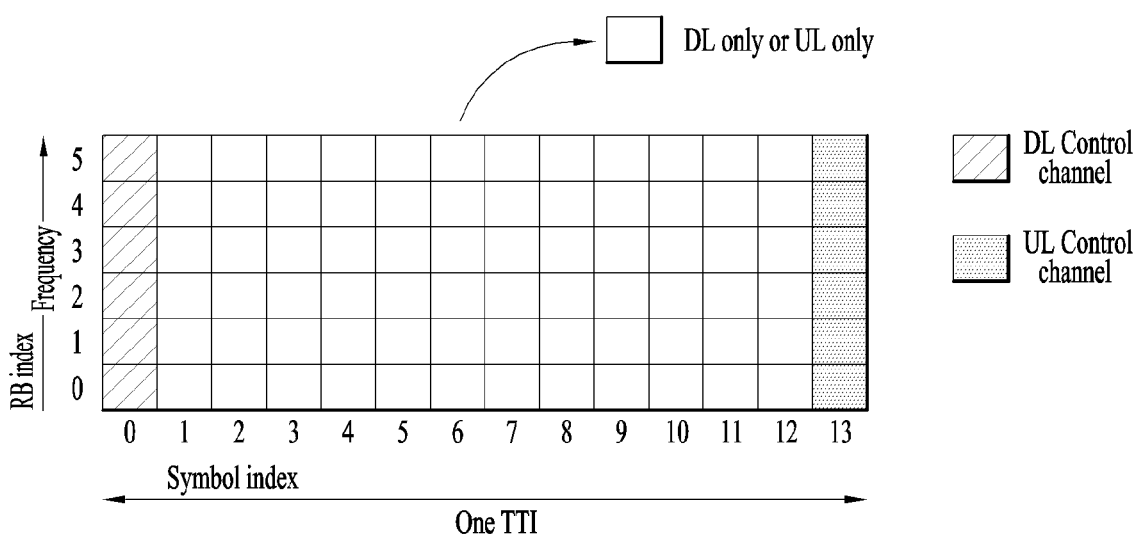
FIG. 8 shows an example of a self-contained subframe structure.

In order to minimize data transmission latency in a TDD system, the 5G NewRAT is considering such a self-contained subframe structure as shown in FIG. 8. FIG. 8 shows one example of a self-contained subframe structure.

In FIG. 8, a slashed region indicates a DownLink (DL) control region and a black part indicates an UpLink (UL) control region. A non-marked region may be used for DL data transmission or UL data transmission. Regarding features of this structure, as a DL transmission and a UL transmission are sequentially progressed in a single subframe, DL data may be sent in a subframe or UL ACK/NACK may be received in a subframe.

Eventually, it is able to reduce a time taken to data retransmission in case of occurrence of data transmission error, whereby latency of final data forwarding can be minimized.

In such a self-contained subframe structure, a time gap for a process for a base station and UE to switch from a transmitting (Tx) mode to a receiving (Rx) mode or from an Rx mode to a Tx mode is necessary. To this end, some OFDM Symbol (OS) at a Downlink-to-Uplink (DL-to-UL) switching timing in a self-contained subframe structure is configured as a Guard Period (GP).

For one example of a self-contained subframe type configurable/settable in a NewRAT based operating system, at least 4 kinds of subframe type can be considered as follows.

DL control interval+DL data interval+GP+UL control interval

DL control interval+DL data interval

DL control interval+GP+UL data interval+UL control interval

DL control interval+GP+UL data interval

Meanwhile, in NR system, two kinds of schemes are considered for an interference measurement method. According to a first scheme, interference measurement is performed based on Non-Zero Power (NZP) CSI-RS, which is a method of deriving an interference signal by removing CSI-RS from a received signal. A second scheme is a method of emulating interference using an effective channel in which a channel and a precoding matrix are combined together, which will be described later.

In NR system, for the CSI reporting relevant configuration, a BS informs a UE of CSI measurement setting and CSI reporting setting through RRC signaling. In the CSI measurement setting, configuration of RS/IMR required for channel or interference measurement in case of CSI calculation is set. In the CSI reporting setting, calculating and reporting a CSI using a prescribed RS/IMR combination among RSs/IMRs configured in the CSI measurement setting is set. Meanwhile, a multitude of (NZP) CSI-RSs for channel measurement may exist. According to a related art, a UE selects one of a multitude of the CSI-RSs as a CSI-RS Resource Indicator (CRI) and calculates and reports a CSI with reference to the selected CSI-RS. Based on such discussion, an interference measuring method proposed by the present invention is described on the basis of the aforementioned first and second schemes.

<First Scheme Based Interference Measurement>

First of all, a case of estimating interference using NZP CSI-RS selected by a UE is described.

Proposal 1)

As described above, a UE measures a channel using NZP CSI-RS selected as CRI and then reconstructs a received signal of the NZP CSI-RS using the measured channel. Thereafter, the UE removes the received signal reconstructed by the UE from an actual received signal, measures a residual signal at a position of an RE of the NZP CSI-RS, and regards the measured signal as interference.

Although it may seem to be that the context of determining NZP CSI-RS used for interference estimation after selection of CRI is established, the NZP CSI-RS used for the interference measurement is actually determined from a process for selecting the CRI. For example, when two CSI-RSs, i.e., CSI-RS #1 and CSI-RS #2 are configured for channel estimation, a UE measures a channel using the CSI-RS #1. And, the UE measures interference using a residual signal resulting from removing the CSI-RS #2 from a received signal, thereby measuring Signal-to-Interference-plus-Noise Ratio) (SINR) #1. Likewise, the UE measures a channel suing the CSI-RS #2 and then measures SINR #2 by measuring interference using a residual signal resulting from removing the CSI-RS #2 from the received signal. Thereafter, the UE compares the SINR #1 and the SINR #2 with each other, thereby selecting CSI-RS corresponding to a higher SINR as CRI.

Alternatively, in an implementation scheme of performing CSI determination preferentially without performing such processes as SINR calculation and comparison and the like, i.e., considering interference (e.g., an implementation scheme of selecting CRI based on a metric about a specific signal strength such as Reference Signals Received Power (RSRP) for each NZP CSI-RS and the like), the interference measurement may be performed on NZP CSI-RS only based on the above-determined CRI.

Alternatively, interference from all CSI-RSs is measured when CRI is calculated. Thereafter, interference measurement may be performed using CSI-RS selected as CRI only. For example, when CSI-RS #1 and CSI-RS #2 are configured for channel estimation, a UE measures a channel using the CSI-RS #1. And, the UE measures SINR #1 by measuring interference using a residual signal resulting from removing the CSI-RS #1 and the CSI-RS #2 from a received signal. Likewise, the UE measures a channel suing the CSI-RS #2 and then measures SINR #2 by measuring interference using a residual signal resulting from removing the CSI-RS #1 and the CSI-RS #2 from the received signal. Thereafter, the UE compares the SINR #1 and the SINR #2 with each other, thereby selecting CSI-RS corresponding to a higher SINR as CRI.

A BS may apply a different residual interference signal to each CSI-RS, thereby showing a different interference per CSI-RS to a UE, or may apply the same residual interference signal. This is a UE-transparent operation basically. For example, when a BS configures two CSI-RSs, the two CSI-RSs may be managed and operated as a combination shown in Table 1.

TABLE 1

|  | Relation between channels of CSI-RS #1 and CSI-RS #2 | Relation between residual interferences of CSI-RS #1 and CSI-RS #2 |
| --- | --- | --- |
| Case 1 | Different | Different |
| Case 2 | Same | Different |
| Case 3 | Different | Same |

In Case 2, a BS receives feedback of an interference-minimized CSI by assuming different interference (from another UE/cell/TP/sector) despite the same channel. In Case 3, a BS receives feedback of a good channel in a manner of differently configuring a channel by a method of using a different analog beam or panel per CSI-RS despite the same interference. In Case 1, a BS receives a best CSI in a manner of changing both interference and channel. Basically, a UE always assumes Case 1, whereby CSI-RS #1 and CSI-RS #2 are independently used for channel measurement or interference measurement. Although the actual BS operation actually corresponds to Case 2 or Case 3, the UE is unable to aware of it and uses RS independently. According to a further advanced operation, a UE recognizes the fact of Case 2 or Case 3 and takes an operation optimized for the recognized fact.

For example, since channels of CSI-RS #1 and CSI-RS #2 are the same in Case 2, a UE can raise channel estimation accuracy using both CSI-RS #1 and CSI-RS #2 (e.g., by calculating an average channel of channels of CSI-RS #1 and CSI-RS #2). In Case 2, CRI is used not for the purpose of channel selection anymore but for the purpose of interference selection.

In Case 3, since residual interferences of CSI-RS #1 and CSI-RS #2 are the same, a UE can raise interference estimation accuracy using both CSI-RS #1 and CSI-RS #2 (e.g., by calculating an average interference of residual interferences of CSI-RS #1 and CSI-RS #2). To this end, the BS should inform the UE of each case by distinguishing the cases.

Of course, it is also possible to provide linkage signaling for indicating that two or more configured NZP CSI-RSs have the same channel relation like Case 2 or the actually same residual interference relation like Case 3. Namely, the UE operation like Case 2 or Case 3 according to each linkage signaling information is applied between the specific linkage provided NZP CSI-RSs, or the above-described operation of Case 1 is applied as a default operation between NZP CSI-RSs of which linkage signaling information is not provided. Namely, the BS informs the UE whether channels of multiple CSI-RSs are the same or whether residual interferences of multiple CSI-RSs are the same, and then the UE should calculate a CSI correspondingly.

Proposal 2)

Meanwhile, a UE may report an I-CRI for selecting a CSI-RS for interference measurement to a BS separately from a CRI for selecting a CSI-RS for channel measurement. The UE calculates a CSI by performing channel measurement from a CSI-RS selected with the CRI and performing interference measurement from a CSI-RS selected with the I-CRI. Basically, a CSI-RS group selectable with a CRI and a CSI-RS group selectable with an I-CRI may be identical to each other. Yet, to secure flexibility of management, the BS may classify a CSI-RS group for channel measurement and a CSI-RS group for interference measurement and configure the classified CSI-RS groups to the UE. The UE then selects a CRI and an I-CRI from the CSI-RS group for channel measurement and the CSI-RS group for interference measurement, respectively and then reports them.

The proposal 1) corresponds to a case that CRI and I-CRS are always restricted so as to be identical to each other. If a BS can configure a small-sized interference as a residual interference by a method of emulating interference in a manner of emulating a small-sized interference for a specific channel, e.g., using a spatial domain orthogonal to a specific channel, the proposal 1) is valid. For example, for single-cell multi-user scheduling, a BS can emulate interference in a direction having less multi-user interference.

Yet, the proposal 1) is not valid in a specific situation. For example, in a situation that CoMP between two TPs having big backhaul latency is established, as one TP (or a serving TP) is not aware of a channel between another TP and a UE, it is unable to know how a minimum interference is caused by applying a prescribed residual interference to a specific CSI-RS. In such a situation, a UE freely selects and reports an I-CRI separately from a CRI and an operation of calculating a CSI based on this is preferably performed.

The I-CRI may be reported as various frequency granularities such as Wideband (WB) and Subband (SB), and a BS can inform a UE of granularity information (and vice versa).

Proposal 3)

Additionally, it is necessary to consider a case of performing interference estimation using NZP CSI-RS designated by a BS.

First of all, when a UE calculates a single CSI, a BS may designate a CSI-RS used for interference measurement per CSI-RS by RRC/MAC level signaling. For example, if 4 CSI-RSs are configured for channel measurement, as shown in Table 2, a BS can designate a CSI-RS used for interference measurement per CSI-RS.

TABLE 2

|  | IMR used for interference measurement in CSI calculation | IMR density |
| --- | --- | --- |
| CSI-RS #1 (2 ports) for channel estimation | CSI-RS #1 & CSI-RS #2 | 4 RE/RB |
| CSI-RS #2 (2 ports) for channel estimation | CSI-RS #1 & CSI-RS #2 | 4 RE/RB |
| CSI-RS 3 (4 ports) for channel estimation | CSI-RS 3 | 4 RE/RB |
| CSI-RS 4 (8 ports) for channel estimation | CSI-RS 4 | 8 RE/RB |

Such configuration can be represented as various embodiments. For example, since each of CSI-RS #1 and CSI-RS #2 for channel estimation is configured with 2 ports, if each of them is used as an IMR, density of IMR resource is low so as to decrease interference estimation accuracy. Therefore, when interference is measured, CSI-RS #1 and CSI-RS #2 are preferably used in a manner of being bundled together. In doing so, a BS should secure residual interference property (e.g., beamforming of an interference signal) of CSI-RS #1 and CSI-RS #2 identically. Since the port number of each of CSI-RS #3 and CSI-RS #4 is sufficient, interference is measured using a CSI-RS used for channel measurement only without the help of other CSI-RS for the interference measurement.

A UE uses a CSI-RS, which was used for channel estimation on CSI calculation, as default for interference channel estimation. And, a BS configures an additional CSI-RS only if an addition resource is required for the purpose of IMR density increase and the like. If the additional CSI-RS is configured, the UE estimates an interference channel using the configured CSI-RS and all the CSI-RS used for the channel estimation. For example, if the CSI-RS port number used for channel estimation is smaller than N, the BS configures an additional CSI-RS for channel estimation to increase density. Here, a value of the N may be reported as UE capability by the UE or notified to the UE by RRC/MAC layer signaling. Or, the BS always guarantees that the port number of CSI-RS for channel estimation (or a sum of the port number of CSI-RS for channel estimation) becomes equal to or greater than K. Here, a value of the K is reported as UE capability by the UE.

As described above, in case of using several CSI-RSs for channel estimation simultaneously, the several CSI-RSs are preferably transmitted at the same timing (e.g., the same slot). If they are transmitted at different timings, it means that a single IMR is transmitted at two timings by being divided. Thus, a delay of an interference measurement timing means a delay of CSI calculation eventually.

Proposal 4)

As described above, in case that several CSI-RSs are configured for channel measurement, a UE may measure residual interference using all CSI-RSs. In this case, since resource density of IMR is increased, accurate interference amount measurement is possible. Yet, if a transmission timing is different per CSI-RS, for example, if a transmission timing is different as period per CSI-RS, offset and the like are configured different in a periodic CSI-RS, a single IMR is transmitted at several timings in a manner of being divided, whereby CSI calculation may be delayed. To solve it, a BS may put restriction that all NZP CSI-RSs are transmitted at the same timing. Or, a UE calculates a CSI using an IMR existing at a transmission timing of a CSI-RS used for channel estimation for CSI calculation on (or using an IMR existing at the corresponding transmission timing or a timing previous to the corresponding transmission timing).

Proposal 5)

Meanwhile, in case that a CSI-RS for interference measurement has multiple ports, interference different per port group can be measured. For example, if a single CSI-RS resource is defined as multiple ports, a UE measures interferences different from each other between TDMed/FDMed ports or port groups.

For example, when 8-port CSI-RS is configured, interferences different from each other in ports 1 to 4 (hereinafter, port group A) CDMed and ports 5 to 8 (hereinafter port group B) CDMed on another RE are measured independently. Here, the port group A and the port group B are TDMed/FDMed. A UE calculates a CSI by selecting a preferred interference from the two interferences estimated from the port group A and the port group B and then feeds back port group information (i.e., whether it is the port group A or the port group B) used for the interference measurement to a BS together with the CSI. Or, the UE calculates a CSI per port group (i.e., the UE separately calculates a CSI that assumes an interference of the group A and a CSI that assumes an interference of the group B) without selecting a port group and then reports all CSIs to the BS.

In this operation, it may be configured/indicated that interferences are calculated by being divided into port groups and that channel measurement is calculated for all port groups at a time. In this case, since interferences are different per port group, the UE reports a multitude of CSIs that assume various interferences to the BS.

Or, the BS may designate a specific port group to use for interference measurement to the UE and informs the UE of the designated group. The BS groups ports corresponding to a single CSI-RS resource and informs the UE of the port group information. Thus, in case of measuring interference using a CSI-RS by a port group unit, accurate interference measurement is possible if the total port number of the corresponding CSI-RS is sufficiently large. Therefore, it is necessary to put such restrictions that the interference measurement is performed per port group on a CSI-RS of preset N ports or more only.

Proposal 6)

A BS may configure a plurality of CSI-RSs for channel measurement for a UE. The UE may make a single CSI-RS resource by aggregating the corresponding CSI-RSs and then estimate a channel. For example, a BS configures three 4-port CSI-RSs for a UE in order to configure a 12-port CSI-RS and instructs the UE to estimate a channel for 12 ports after generating a single 12-port CSI-RS by aggregating the corresponding three CSI-RSs. In this case, whether all or some of the aggregated multiple CSI-RSs will be used for interference measurement can be additionally configured to the UE by the BS. For example, definitions can be made as follows. First of all, interference is measured using a CSI-RS having the greatest port number among the aggregated multiple CSI-RSs only. Secondly, if there are several CSI-RSs having the greatest port number each, interference is measured using a CSI-RS of a minimum index only.

Or, it may be defined that all of the multiple CSI-RSs to be aggregated are always used for interference measurement. Additionally, if the port number of a CSI-RS having the greatest port number among the aggregated multiple CSI-RSs is equal to or greater than a specific value, the corresponding CSI-RS may be defined to be used only. Otherwise, interference measurement may be defined to be performed using all CSI-RSs.

Or, residual interference properties among multiple CSI-RSs to be aggregated are set different, respectively. A UE selects one of the CSI-RSs and uses the selected CSI-RS for residual interference measurement. The UE feeds back the selected-RS together with a CSI. Through this, a BS can advantageously consider the interference property linked to the CSI-RS, which was selected and reported by the UE, for the subsequent scheduling determination.

Or, residual interference properties among multiple CSI-RSs to be aggregated are set different, respectively. A UE calculates each CSI separately using each CSI-RS for residual interference measurement and then feeds back all the CSIs.

<Second Scheme Based Interference Measurement>

A method of emulating interference using an effective channel, in which a channel and a precoding matrix are combined, can be classified into UE-side interference emulation and BS-side interference emulation.

In case of UE-side interference emulation, a UE estimates a channel using a CSI-RS for interference measurement and then generates an interference effective channel by selecting an interference PMI. The UE calculates a CSI by assuming the generated interference effective channel and a desired effective channel of the UE, i.e., a channel generated from applying a PMI to a measured desired channel. In this case, since the UE should additionally feed back an interference PMI together with an existing PMI, a BS preferably restricts a PMI set, which may be applicable as an interference PMI to a UE, to a codebook subset in order to reduce feedback overhead. For example, the BS configures an interference PMI set configured with PMI 1 to PMI 4 only through RRC/MAC level signaling. Subsequently, the UE selects an interference PMI from the four kinds of the PMIs and then feeds back the selected interference PMI as 2-bit information to a BS. More specifically, an n value is set through RRC signaling and a PMI to be used for interference emulation is designated to each of $2^n$ states through MAC/RRC signaling. The UE emulates interference by selecting one of $2^n$ PMI assumptions and then feeds back the corresponding PMI to the BS through an n-bit uplink control signal.

In case of BS-side interference emulation, a UE estimates a channel using a CSI-RS for interference measurement and then regards it as an effective channel of an interference channel Thereafter, the UE calculates a CSI by assuming a generated interference effective channel and a desired effective channel of the UE.

If a BS emulates several interferences and the UE selects a most suitable interference, the BS configures a multitude of CSI-RSs for interference measurement for the UE. The UE selects one of the CSI-RSs as an I-CRI and then reports it. In case that a plurality of CSI-RSs for interference measurement and a plurality of CSI-RSs for channel measurement are configured, as the UE reports both a CRI and an I-CRI, the BS should configure resource groups for the UE in a manner of separating a CSI-RS resource group for selecting a CRI and a CSI-RS resource group for selecting an I-CRI. Namely, regarding a single CSI reporting configuration, a multitude of CSI-RSs for channel measurement and a multitude of CSI-RSs for interference measurement should be defined in a manner of being distinguished from each other. The UE selects a single CSI-RS from a multitude of the CSI-RSs for channel measurement and also selects a single CSI-RS from a multitude of the CSI-RSs for interference measurement and then reports informations on the selected CSI-RSs as a CRI and an I-CRI, respectively.

A CSI-RS resource group for selecting a CRI is configured with CSI-RS resources beamformed in a direction in which a channel size is strong, and a CSI-RS resource group for selecting an I-CRI is configured with CSI-RS resources beamformed in a direction in which a channel size is weak. Thus, by separating the CSI-RS resource groups, the feedback bit number required for the CRI and I-CRI reporting can be saved.

Figure 9:
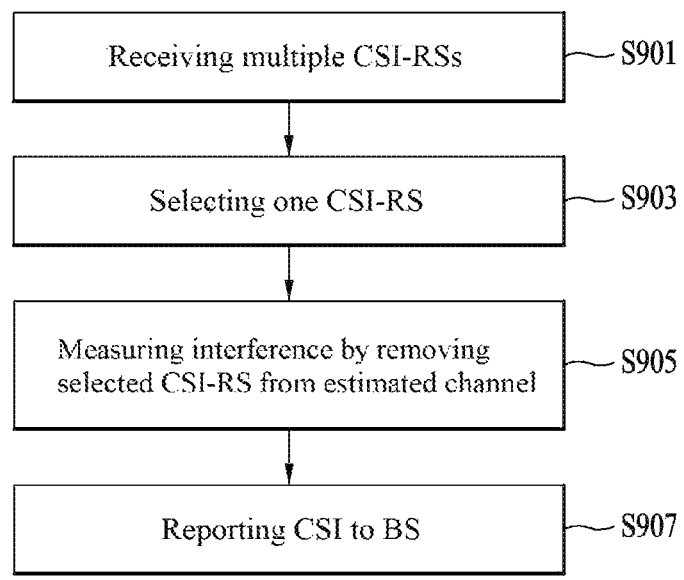
FIG. 9 is a flowchart of one example of a method of reporting a CSI according to an embodiment of the present invention.

FIG. 9 is a flowchart of one example of a method of reporting a CSI according to an embodiment of the present invention.

Referring to FIG. 9, in a step S901, a UE receives a plurality of NZP CSI-RSs from a BS. In doing so, information indicating whether channels corresponding to a plurality of the NZP CSI-RSs are identical can be received as well.

Subsequently, in a step S903, the UE selects a single NZP CSI-RS based on the reception power of a plurality of the NZP CSI-RSs. In a step S905, the UE measures interference in a manner of removing the selected NZP CSI-RS from a channel estimated using the selected NZP CSI-RS. Preferably, if the antenna port number of the selected NZP CSI-RS is equal to smaller than a threshold, the UE can measure interference in a manner of removing a specific NZP CSI-RS linked to the selected NZP CSI-RS from the channel estimated using the selected NZP CSI-RS together with the selected NZP CSI-RS. More preferably, the specific NZP CSI-RS and the selected NZP CSI-RS need to be received at the same timing.

Finally, in a step S907, the UE reports an indicator indicating the selected NZP CSI-RS and a CSI including information on the measured interference to the BS.

Additionally, if the antennae port number of the selected NZP CSI-RS is greater than the threshold, the selected NZP CSI-RSs may be grouped into a plurality of antenna port groups and interferences may be measured on a plurality of the antenna port groups, respectively. In this case, the CSI includes information on the antenna port groups.

Figure 10:
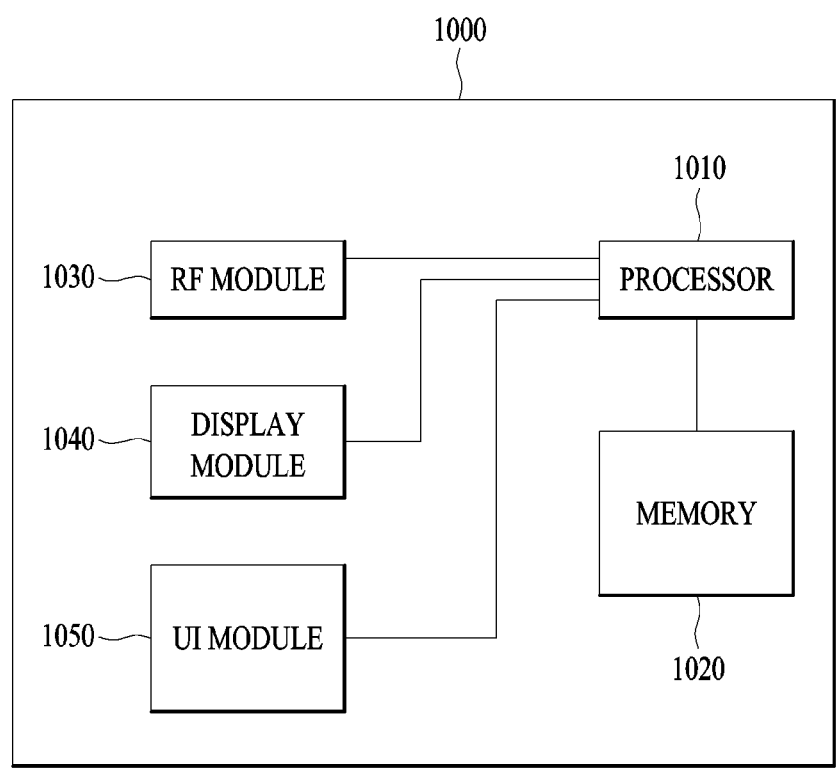
FIG. 10 is a block diagram of a communication apparatus according to an embodiment of the present invention.

FIG. 10 is a block diagram illustrating a communication device according to embodiments of the present invention.

In FIG. 10, the communication device 1000 includes a processor 1010, a memory 1020, a Radio Frequency (RF) module 1030, a display module 1040, and a user interface (UI) module 1050.

The communication device 1000 is disclosed for illustrative purposes only and certain modules may also be omitted from the communication device 1000 as necessary. In addition, the communication device 1000 may further include necessary modules. Some modules of the communication device 1000 may be identified as more detailed modules. The processor 1010 is configured to carry out the operations of the embodiments of the present invention. For detailed operations of the processor 1010 reference may be made to FIGS. 1 to 9.

The memory 1020 is connected to the processor 1010, and stores an operating system, applications, program code, data and the like. The RF module 1030 is connected to the processor 1010 and converts a baseband signal into a radio frequency (RF) signal, or converts the RF signal into the baseband signal. For these operations, the RF module 1030 performs analog conversion, amplification, filtering, and frequency up-conversion in order or performs such operations in reverse order. The display module 1040 is connected to the processor 1010 and displays a variety of information. The scope or spirit of the display module 1040 of the present invention is not limited thereto, and the display module 1040 may be any of well-known elements, for example, a Liquid Crystal Display (LCD), a Light Emitting Diode (LED), an Organic Light Emitting Diode (OLED) and the like. The user interface (UI) module 1050 is connected to the processor 1010, and may be implemented as a combination of user interfaces such as a keypad, a touchscreen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although the aforementioned method of performing interference measurement in a next generation wireless communication system and apparatus therefor are described by focusing on examples applying to the 3GPP LTE system, they are applicable to various wireless communication systems as well as to the 3GPP LTE system.

What is claimed is:

1. A method of reporting Channel Status Information (CSI) to a base station by a user equipment in a wireless communication system, the method comprising:
    receiving a plurality of Non-Zero-Power (NZP) Channel Status Information-Reference Signals (CSI-RSs) from the base station;
    selecting one of the plurality of NZP CSI-RSs based on reception power of the plurality of the NZP CSI-RSs;
    measuring interference based on the selected NZP CSI-RS; and
    reporting the CSI including an indicator indicating the selected NZP CSI-RS and information about the measured interference to the base station,
    wherein based on a number of antenna ports of the selected NZP CSI-RS being equal to or less than a threshold, measuring the interference, wherein measuring the interference comprises measuring the interference based on both the selected NZP CSI-RS and a specific NZP CSI-RS received with the selected NZP CSI-RS at a same timing.

2. The method of claim 1,
    wherein based on the number of antenna ports of the selected NZP CSI-RS being greater than the threshold, measuring the interference, wherein measuring the interference comprises grouping the antenna ports of the selected NZP CSI-RS into a plurality of antenna port groups, and measuring interference related to each of the plurality of antenna port groups, and wherein the reported CSI includes information about the interference related to each of the plurality of the antenna port groups.

3. A user equipment in a wireless communication system, the user equipment comprising:

a transmitter and receiver; and a processor operably coupled to the transmitter and receiver, and configured to report Channel Status Information (CSI) to a base station through the transmitter, wherein the processor is further configured to receive, through the receiver, a plurality of Non-Zero-Power (NZP) Channel Status Information-Reference Signals (CSI-RSs) from the base station, select one of the plurality of NZP CSI-RSs based on reception power of the plurality of NZP CSI-RSs, and measure interference by removing the selected NZP CSI-RS from a channel estimated using the selected NZP CSI-RS, and wherein the CSI includes an indicator indicating the selected NZP CSI-RS and information about the measured interference, wherein based on a number of antenna ports of the selected NZP CSI-RS being equal to or less than a threshold, measuring the interference, wherein measuring the interference comprises measuring the interference based on both the selected NZP CSI-RS and a specific NZP CSI-RS received with the selected NZP CSI-RS at a same timing.

4. The user equipment of claim 3, wherein based on the number of antenna ports of the selected NZP CSI-RS being greater than the threshold, measuring the interference, wherein measuring the interference comprises grouping the antenna ports of the selected NZP CSI-RS into a plurality of antenna port groups, and measuring interference related to each of the plurality of the antenna port groups, and wherein the reported CSI includes information about the interference related to each of the plurality of the antenna port groups.

* * * * *